United States Patent
Jun et al.

(10) Patent No.: US 12,332,270 B2
(45) Date of Patent: Jun. 17, 2025

(54) IMPLEMENT-ON-GROUND DETECTION USING VIBRATION SIGNALS

(71) Applicant: Caterpillar Trimble Control Technologies LLC, Dayton, OH (US)

(72) Inventors: Jung Hyun Jun, Canterbury (NZ); Peter France, Canterbury (NZ); Alistair Baker, Canterbury (NZ); Colin Daniell, Canterbury (NZ); Alan Greenstreet, Canterbury (NZ); Jeremy Wyn-Harris, Canterbury (NZ)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 397 days.

(21) Appl. No.: 17/493,793

(22) Filed: Oct. 4, 2021

(65) Prior Publication Data
US 2023/0106822 A1    Apr. 6, 2023

(51) Int. Cl.
| | |
|---|---|
| *G01P 15/00* | (2006.01) |
| *E02F 3/43* | (2006.01) |
| *E02F 9/26* | (2006.01) |
| *G01C 19/00* | (2013.01) |
| *G05B 13/02* | (2006.01) |
| *G05B 13/04* | (2006.01) |

(52) U.S. Cl.
CPC ............. *G01P 15/00* (2013.01); *E02F 3/435* (2013.01); *E02F 9/262* (2013.01); *G01C 19/00* (2013.01); *G05B 13/0265* (2013.01); *G05B 13/048* (2013.01)

(58) Field of Classification Search
CPC . G01P 15/00; E02F 3/435; E02F 9/262; E02F 9/264; G01C 19/00; G05B 13/0265; G05B 13/048
See application file for complete search history.

(56) References Cited

U.S. PATENT DOCUMENTS

| | | | |
|---|---|---|---|
| 9,982,414 B2 | 5/2018 | Jang | |
| 2014/0196919 A1* | 7/2014 | Kowalchuk | ............ A01B 63/32 701/50 |

(Continued)

FOREIGN PATENT DOCUMENTS

| | | | |
|---|---|---|---|
| JP | 2016099744 A | * | 5/2016 |
| WO | 2020/162428 A1 | | 8/2020 |
| WO | 2020/241419 A1 | | 12/2020 |

OTHER PUBLICATIONS

Machine Translation: JP-2016099744-A (Year: 2016).*

(Continued)

*Primary Examiner* — Anne Marie Antonucci
*Assistant Examiner* — Connor L Knight
(74) *Attorney, Agent, or Firm* — Kilpatrick Townsend & Stockton LLP

(57) ABSTRACT

Described herein are systems, methods, and other techniques for determining a period during which an implement of a construction machine is interacting with a ground surface. A vibration signal that is indicative of a movement of the implement is captured. One or more features are extracted from the vibration signal. The one or more features are provided to a machine-learning model to generate a model output. An implement-on-ground (IOG) start time and an IOG end time are predicted based on the model output, the IOG start time and the IOG end time forming the period.

19 Claims, 11 Drawing Sheets

(56) References Cited

U.S. PATENT DOCUMENTS

| | | | | |
|---|---|---|---|---|
| 2017/0314987 | A1* | 11/2017 | Yamada | E02F 9/2221 |
| 2020/0326715 | A1* | 10/2020 | Hurd | G05D 1/0214 |
| 2021/0025143 | A1* | 1/2021 | Cohen | G05D 1/0274 |
| 2021/0292999 | A1* | 9/2021 | Hamada | G07C 5/0825 |
| 2022/0220709 | A1* | 7/2022 | Kamon | E02F 9/2285 |
| 2023/0213908 | A1* | 7/2023 | Ohno | G05B 19/042 700/28 |

OTHER PUBLICATIONS

International Search Report and Written Opinion for Application No. PCT/US2022/045215, mailed Jan. 27, 2023, 17 pages.

Cheng, C.-F. et al., "Activity analysis of construction equipment using audio signals and support vector machines," *Automation in Construction*, 81, 2017, pp. 240-253.

\* cited by examiner

IMPLEMENT-ON-GROUND DETECTION USING VIBRATION SIGNALS

BACKGROUND OF THE INVENTION

Modern mobile machinery, including construction and agricultural machines, have dramatically increased the efficiency of performing various work-related tasks. For example, earthmoving machines employing automatic grade control systems are able to grade project areas using fewer passes than what was previously done manually. As another example, modern asphalt pavers and other road makers have allowed replacement of old roads and construction of new roads to occur on the order of hours and days instead of what once took place over weeks and months. Due to the automation of various aspects, construction and agriculture projects can be carried out by crews with fewer individuals than what was previously required. Much of the technological advances of mobile machinery are owed in part to the availability of accurate sensors that allow real-time monitoring of the condition and position of a machine's components and/or the environment surrounding the machine.

SUMMARY OF THE INVENTION

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a method of determining a period during which an implement of a construction machine is interacting with a ground surface, the method comprising: capturing a vibration signal that is indicative of a movement of the implement; extracting one or more features from the vibration signal; providing the one or more features to a machine-learning model to generate a model output; and predicting an implement-on-ground (IOG) start time and an IOG end time based on the model output, the IOG start time and the IOG end time forming the period during which the implement is interacting with the ground surface.

Example 2 is the method of example(s) 1, wherein the vibration signal is captured using a vibration sensor mounted to the construction machine.

Example 3 is the method of example(s) 2, wherein the vibration sensor includes an accelerometer and the vibration signal includes an acceleration signal.

Example 4 is the method of example(s) 2, wherein the vibration sensor includes a gyroscope and the vibration signal includes a rotation signal.

Example 5 is the method of example(s) 2, wherein the vibration sensor is mounted to the implement.

Example 6 is the method of example(s) 1-5, wherein the model output includes a set of IOG candidates corresponding to times at which the implement is interacting with the ground surface.

Example 7 is the method of example(s) 1-6, wherein the model output includes a set of implement-in-air (IIA) candidates corresponding to times at which the implement is not interacting with the ground surface.

Example 8 is the method of example(s) 1-7, wherein the one or more features include at least one of signal amplitude features or signal frequency features.

Example 9 is the method of example(s) 1-8, wherein the machine-learning model is a pre-trained support-vector machine.

Example 10 is the method of example(s) 1-9, further comprising: adjusting a ground surface map based on the period during which the implement is interacting with the ground surface and a path of the implement.

Example 11 is a system comprising: one or more processors; and a computer-readable medium comprising instructions that, when executed by the one or more processors, cause the one or more processors to perform operations comprising: capturing a vibration signal that is indicative of a movement of the implement; extracting one or more features from the vibration signal; providing the one or more features to a machine-learning model to generate a model output; and predicting an implement-on-ground (IOG) start time and an IOG end time based on the model output, the IOG start time and the IOG end time forming the period during which the implement is interacting with the ground surface.

Example 12 is the system of example(s) 11, wherein the vibration signal is captured using a vibration sensor mounted to the construction machine.

Example 13 is the system of example(s) 12, wherein the vibration sensor includes an accelerometer and the vibration signal includes an acceleration signal.

Example 14 is the system of example(s) 12, wherein the vibration sensor is mounted to the implement.

Example 15 is the system of example(s) 11-14, wherein the model output includes a set of IOG candidates corresponding to times at which the implement is interacting with the ground surface.

Example 16 is the system of example(s) 11-15, wherein the model output includes a set of implement-in-air (IIA) candidates corresponding to times at which the implement is not interacting with the ground surface.

Example 17 is the system of example(s) 11-16, wherein the one or more features include at least one of signal amplitude features or signal frequency features.

Example 18 is the system of example(s) 11-17, wherein the machine-learning model is a pre-trained support-vector machine.

Example 19 is the system of example(s) 11-18, wherein the IOG start time and the IOG end time are predicted further based on a set of implement positions.

Example 20 is a method of determining a period during which an implement of a construction machine interacts with a ground surface, the method comprising: capturing a vibration signal that is indicative of a movement of the implement; determining a set of implement-on-ground (IOG) candidates corresponding to times at which the implement is interacting with the ground surface; determining a set of implement-in-air (IIA) candidates corresponding to times at which the implement is not interacting with the ground surface; and predicting an IOG start time and an IOG end time based on the set of IOG candidates and the set of IIA candidates, the IOG start time and the IOG end time forming the period during which the implement is interacting with the ground surface.

Example 21 is a non-transitory computer-readable medium comprising instructions that, when executed by one or more processors, cause the one or more processors to perform any of the methods of example(s) 1-10 or 20.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

Figure 1A:
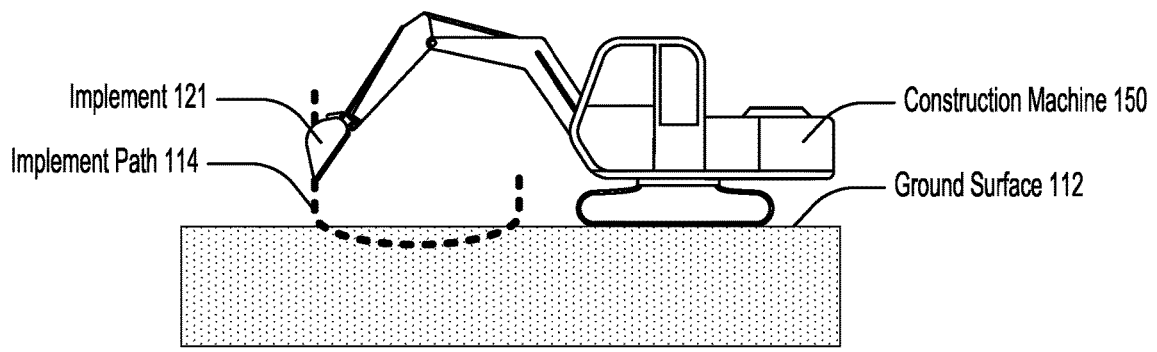
FIGS. 1A-1C illustrate an example modification of a ground surface map based on an implement path.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label, irrespective of the suffix.

DETAILED DESCRIPTION OF THE INVENTION

In some instances, a construction machine such as an earthmoving machine may maintain a map of the surrounding surface of the ground. This map, which may alternatively be referred to as a "ground surface map", may include a current elevation or height for each of multiple locations surrounding the machine. As the construction machine carries out a construction project by lowering the implement, cutting into the ground surface, and removing and lifting earth, the ground surface map may be updated based on the path of the implement and the period of time during which the implement was interacting with the ground surface. For example, if the implement is cutting into the ground surface during a period of three seconds, then it can be expected that the new ground surface is roughly equal to the implement's position (e.g., the position of the tip of an excavator's blade) during those three seconds. As such, the ground surface map can be adjusted to reflect the new ground surface.

An accurate adjustment of the ground surface map is dependent on two factors, the first being a knowledge of the implement's position and path, and the second being a determination of the time period during which the implement is actually interacting with (e.g., digging into) the ground, which may alternatively be referred to as the "interaction period", the "implement-on-ground (IOG) period", or the "IOG instance". If either of these factors cannot be determined accurately, the ground surface map may be unreliable and can include error spikes, particularly at the positions where the path of the implement intersects the original ground surface. For example, if the IOG period is predicted to start before the actual dig start time, this may cause the ground level map to include a spike in the upward direction as the implement will be above the actual ground surface. Similarly, if the IOG period is predicted to end after the actual dig end time, this may also cause the ground level map to include a spike in the upward direction, as the implement will be finished digging and be above the actual ground surface.

Embodiments of the present disclosure provide techniques for accurately predicting the period during which the implement of a construction machine is interacting with the ground. Embodiments may include predicting an IOG start time at which the implement begins interacting with the ground and an IOG end time at which the implement has finished interacting with the ground, which may correspond to the beginning and end of the IOG period, respectively. The disclosed techniques may rely on a vibration signal captured using a vibration sensor mounted to the construction machine. The vibration signal may be indicative of the movement of the implement during a digging event. In various embodiments, the vibration sensor may be mounted directly to the implement or mounted elsewhere on the construction machine.

Some embodiments may utilize trained machine-learning models, such as neural networks, that receive features of the vibration signal as input to generate the IOG period. In some instances, a machine-learning model may generate a set of IOG candidates corresponding to times that it is predicted that the implement is interacting with the ground and a set of implement-in-air (IIA) candidates corresponding to times that it is predicted that the implement is not interacting with the ground. The sets of IOG and IIA candidates may be analyzed to identify clusters and to predict the IOG period, with the IOG period generally including as many IOG candidates as possible and excluding as many IIA candidates as possible.

Several advantages are achieved by way of the present disclosure. For example, as noted above, by predicting accurate IOG periods, embodiments of the present disclosure allow accurate adjustments of the ground surface map. Such adjustments may be made in real time as the construction machine is operating within a construction environment. As another example, embodiments provide the ability to track the movement of material (e.g., where the material comes from and where it goes to). In certain applications, such as mining, it may be desirable to know whether material is valuable ore or low-value spoil. This determination can be derived from accurate knowledge of when and where the implement contacted the ground surface.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

Figure 1B:
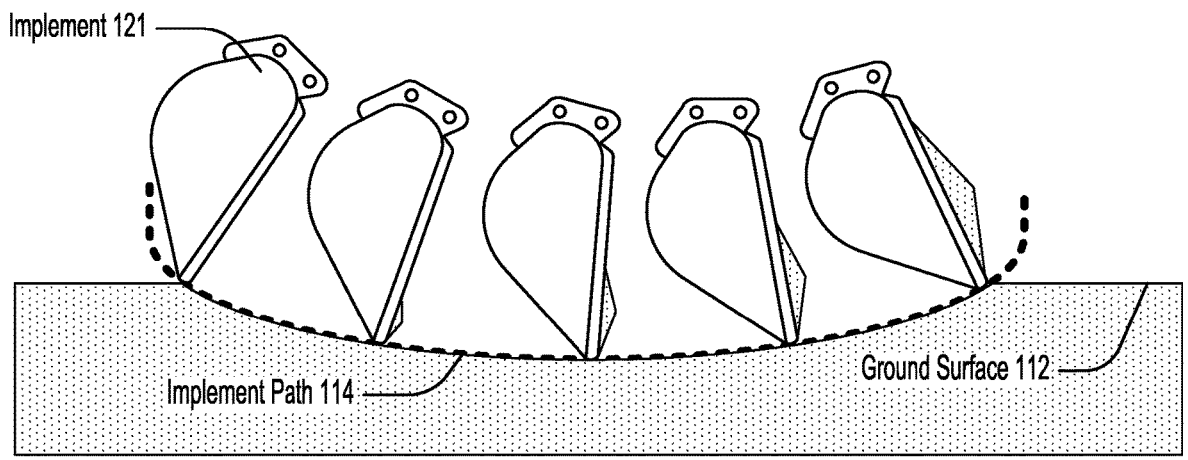
Figure 1C:
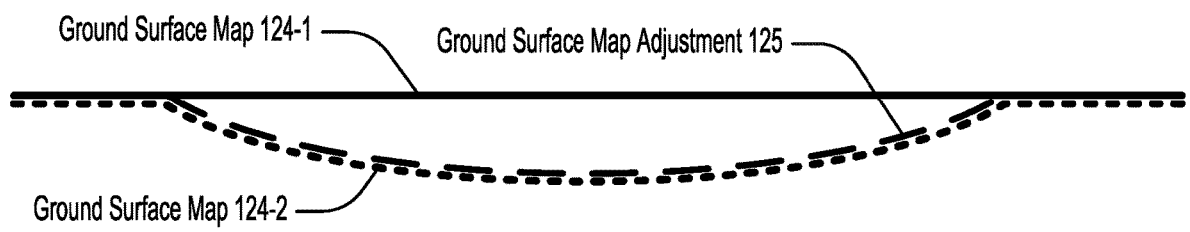

FIGS. 1A-1C illustrate an example modification of a ground surface map 124 based on an implement path 114, in accordance with some embodiments of the present disclosure. In FIG. 1A, a construction machine 150 begins moving an implement 121 along implement path 114. In various embodiments, implement path 114 may be set by an operator of the construction machine and/or may be automatically generated based on the details of a construction project or other work-related task. In FIG. 1B, implement 121 follows implement path 114 and cuts into ground surface 112, thereby modifying ground surface 112 by removing the earth above implement path 114 while leaving the earth below implement path 114.

In FIG. 1C, ground surface map 124 is adjusted based on a ground surface map adjustment 125, which is determined based on implement path 114 and an IOG period corresponding to the time frame of the digging action. In the illustrated example, a previous ground surface map 124-1 is adjusted to produce a new ground surface map 124-2 by replacing previous ground surface map 124-1 with ground surface map adjustment 125 for the locations that ground surface map adjustment 125 includes data (e.g., elevations or heights). For the locations outside of where ground surface map adjustment 125 includes data, new ground surface map 124-2 is set equal to previous ground surface map 124-1.

Figure 2:
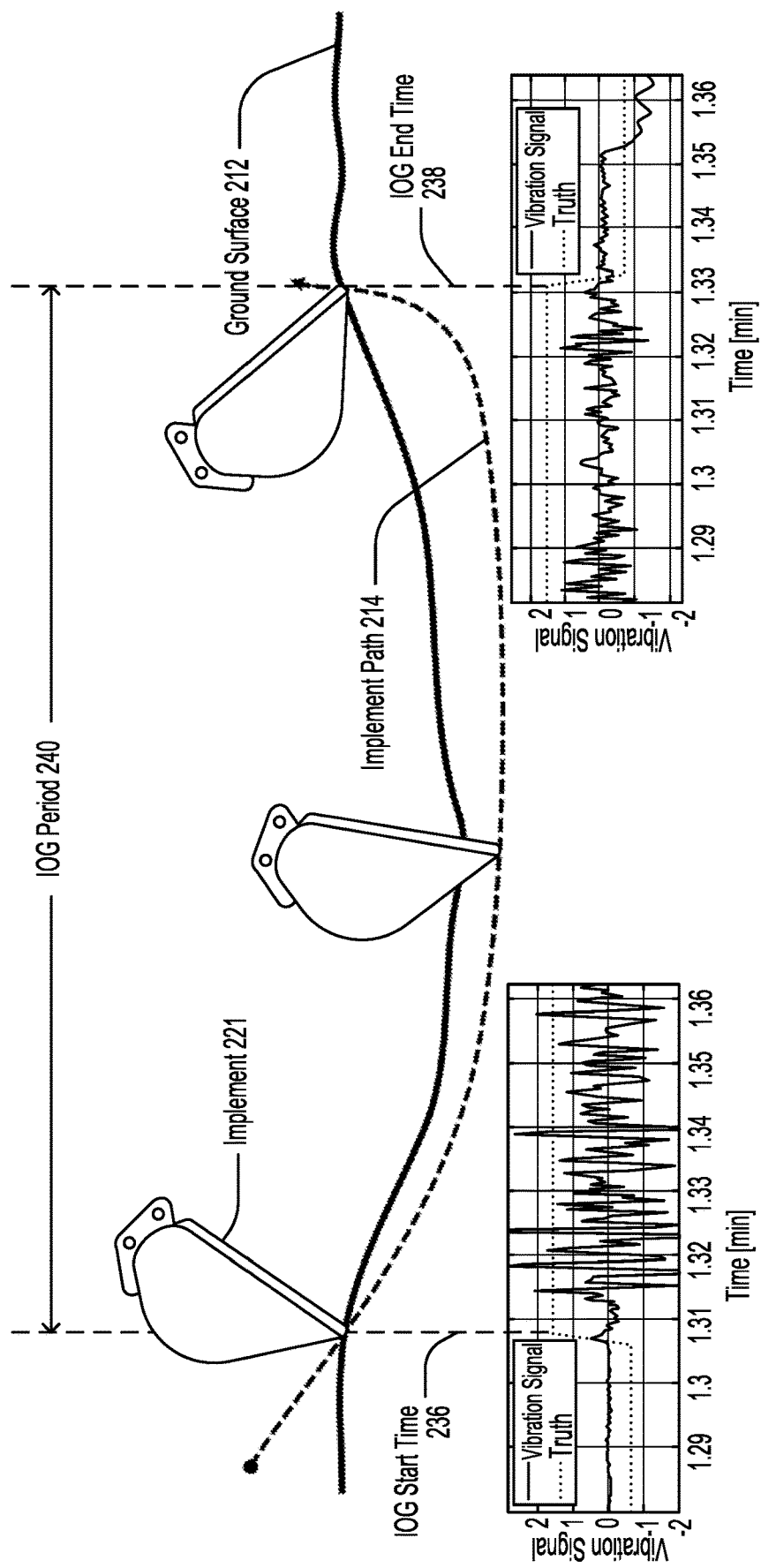
FIG. 2 illustrates an example prediction of an IOG period based on a vibration signal.

FIG. 2 illustrates an example prediction of an IOG period 240 based on a vibration signal 242, in accordance with some embodiments of the present disclosure. In the illustrated example, vibration signal 242 is captured using a vibration sensor while implement 221 is following an implement path 214 that passes through ground surface 212. While not shown, the vibration sensor may be mounted directly to implement 221 or elsewhere on the construction machine. The illustrated vibration signal is an acceleration signal along a particular axis (or any direction in space) that includes both positive and negative acceleration values.

Based on the features in vibration signal 242, an IOG start time 236 (between 1.3 minutes and 1.31 minutes) at which implement 221 begins digging along ground surface 212 and an IOG end time 238 (between 1.46 minutes and 1.47 minutes) at which implement 221 ends digging along ground surface 212 are predicted. In the illustrated example, vibration signal 242 is shown to have higher amplitudes during IOG period 240 compared to outside IOG period 240. Also shown in FIG. 2 is a truth reference showing the actual IOG period (or IOG truth 239) and the corresponding actual IOG start and end times, which illustrate the accuracy of the described techniques of using the vibration signature to predict IOG period 240.

Figure 3:
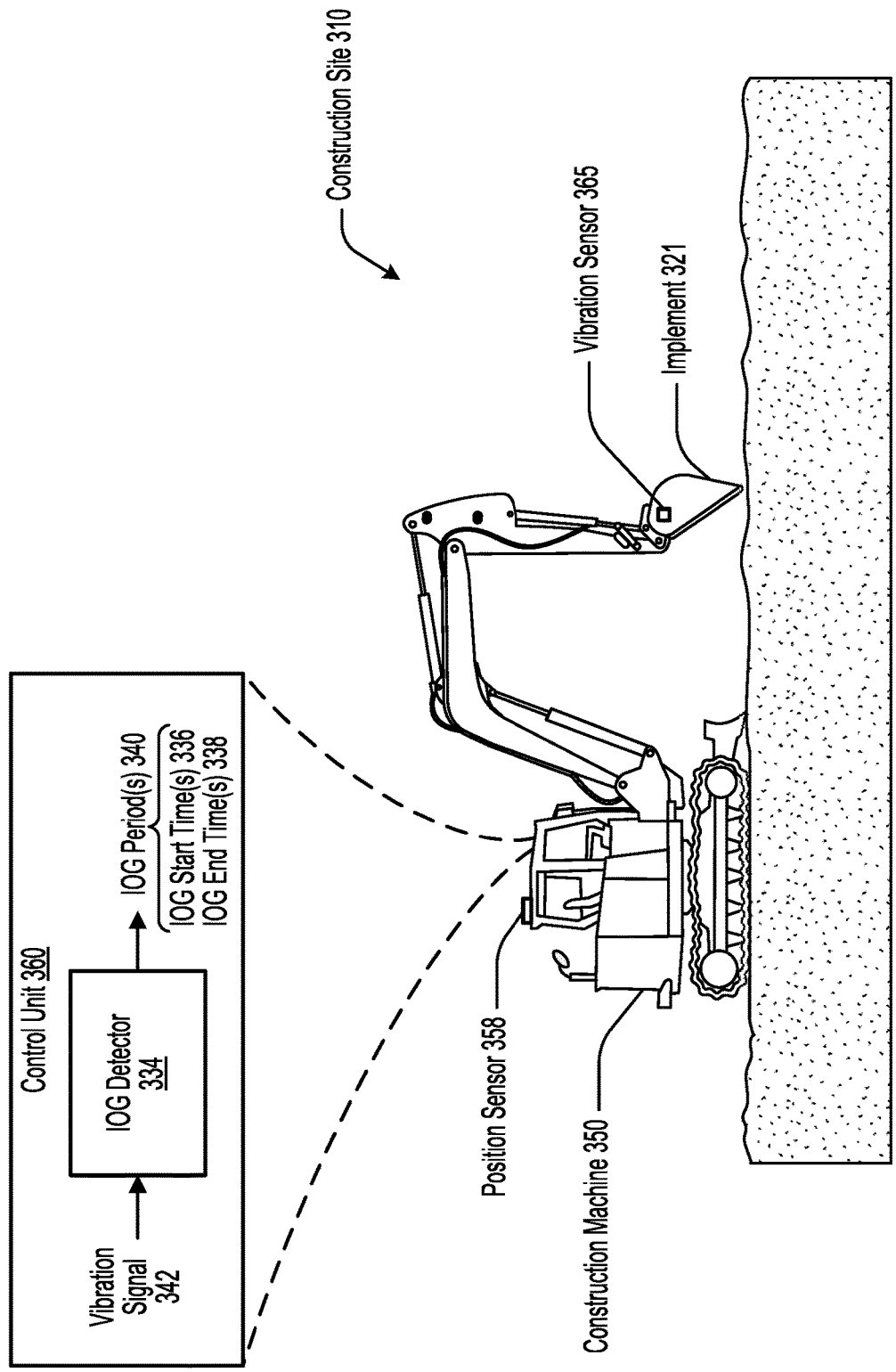
FIG. 3 illustrates an example implementation of one or more techniques of the present disclosure within a construction environment.

FIG. 3 illustrates an example implementation of one or more techniques of the present disclosure within a construction environment. Specifically, FIG. 3 shows a construction machine 350 being deployed at a construction site 310 and having the control thereof at least partially implemented by a control unit 360 which, in various embodiments, may be communicatively coupled to a position sensor 358 and a vibration sensor 365 through a wired and/or wireless connection. While construction site 310 is generally described herein as corresponding to an earthmoving site, the present disclosure may be applicable to a wide variety of construction, maintenance, or agricultural projects in which heavy equipment or mobile machinery are used. Similarly, while construction machine 350 is generally described herein as corresponding to an earthmoving construction machine, the various techniques described herein may be applicable to a wide variety of construction machines or heavy equipment such as graders, excavators, bulldozers, backhoes, pavers (e.g., concrete, asphalt, slipform, vibratory, etc.), compactors, scrapers, loaders, material handlers, combine harvesters, spreaders, and the like.

In some embodiments, construction machine 350 may include a tractor with wheels, axles, and a gasoline-, diesel-, electric-, or steam-powered engine for providing power and traction to construction machine 350 to drive along a desired path, often at a constant speed. Construction machine 350 may be a tracked vehicle that incorporates a continuous track of treads or track plates that are driven by the vehicle's wheels. An operator of construction machine 350 may provide inputs to control unit 360 using various input devices such as levers, switches, buttons, pedals, steering wheels, and touch screens, which can cause various actuators to move construction machine 350.

In some instances, construction machine 350 may include an implement 321, which may be the primary component of construction machine 350 that is controlled to interact with elements of construction site 310. For example, at an earthmoving site, implement 321 may be the component of construction machine 350 that interacts with (e.g., pushes, scoops, cuts, etc.) the earth, such as the blade of a bulldozer, the bucket of an excavator, or the drum of a compactor. As another example, at an agricultural site, implement 321 may be the header of a combine harvester or the boom of a spreader. As another example, at a road construction site, implement 321 may be the screed of an asphalt paver.

It should be appreciated that, in some embodiments, implement 321 and construction machine 350 may be considered to be separate bodies that have a semi-rigid coupling between them. The coupling is semi-rigid in that the bodies can move relative to each other but they can also be fixed at a given orientation. Some examples of semi-rigid couplings used on construction or earthmoving equipment include c-frames, angle c-frames, push arms, L-shaped push arms, and the like.

In some embodiments, control unit 360 may determine a geospatial position 322 of construction machine 350 based on sensor data captured by one or more sensors (e.g., position sensor 358) mounted to construction machine 350. For example, position sensor 358 may be a global navigation satellite systems (GNSS) receiver that receives wireless signals from one or more GNSS satellites 302. By processing the received wireless signals, a position of the GNSS receiver may be calculated. During operation of construction machine 350, geospatial position 322 is determined and is used to query a site design, which may provide translations between two-dimensional (2D) positions within construction site 110 and a desired ground surface or digging depth.

As described herein, in some embodiments, vibration sensor 365 may be used to capture a vibration signal 342 that is indicative of the movement of implement 321. Vibration signal 342 may be provided to an IOG detector 334, which may extract features from vibration signal 342 and provide the extracted features to a machine-learning model that is used to predict one or more IOG period(s) 340. Each of IOG period(s) 340 may occur during a larger digging event (or digging period) and may each correspond to a time period during which implement 321 is interacting with the ground at construction site 310. IOG period(s) 340 may be associated with IOG start time(s) 336 and IOG end time(s) 338.

Figure 4:
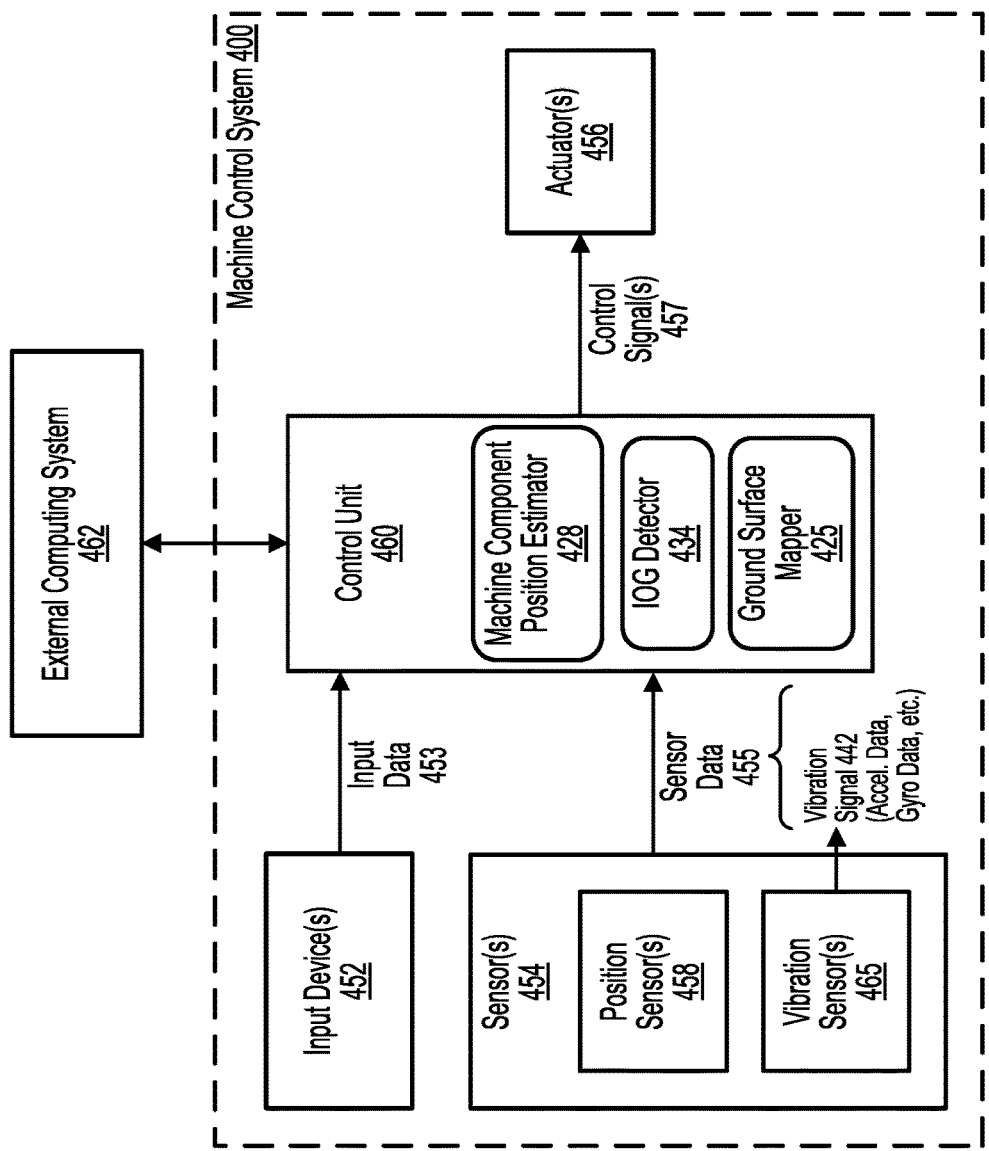
FIG. 4 illustrates an example machine control system.

FIG. 4 illustrates an example machine control system 400, in accordance with some embodiments of the present disclosure. Machine control system 400 may include various input devices 452, sensors 454, actuators 456, and computing devices for allowing one or more operators of the construction machine to complete a work-related task. The components of machine control system 400 may be mounted to or integrated with the components of the construction machine such that the construction machine may be considered to include machine control system 400. The components of machine control system 400 may be communicatively coupled to each other via one or more wired and/or wireless connections.

Machine control system 400 may include a control unit 460 that receives data from the various sensors and inputs and generates commands that are sent to the various actuators and output devices. In the illustrated example, control unit 460 receives input data 453 from input device(s) 452 and sensor data 455 from sensor(s) 454, and generates control signal(s) 457 which are sent to actuator(s) 456. Control unit 460 may include one or more processors and an associated memory. In some embodiments, control unit 460 may be communicatively coupled to an external computing system 462 located external to machine control system 400 and the construction machine. External computing system 462 may send instructions to control unit 460 of the details of a work-related task. External computing system 462 may also send alerts and other general information to control unit 460, such as traffic conditions, weather conditions, the locations and status of material transfer vehicles, and the like.

In some embodiments, input device(s) 452 may receive input data 453 that indicates a desired movement of the vehicle, a desired movement of the implement, a desired height of the implement, an activation of one or more mechanisms on the implement (e.g., rotating the bucket of an excavator), and the like. Input device(s) 452 may include a keyboard, a touchscreen, a touchpad, a switch, a lever, a button, a steering wheel, an acceleration pedal, a brake pedal, and the like. In some embodiments, input device(s) 452 may be mounted to any physical part of the vehicle, such as within the cab of the vehicle.

In some embodiments, sensor(s) 454 may include one or more position sensor(s) 458 and/or vibration sensor(s) 465. Position sensor(s) 458 may be a combination of GNSS receivers, which determine position using wireless signals received from satellites, and total stations, which determine position by combining distance, vertical angle, and horizontal angle measurements. Vibration sensor(s) 465 may include one or more sensors that detect movement of the components of the construction machine to which they are rigidly attached. In some instances, vibration sensor(s) 465 may include one or more microphones or other acoustic sensors. In some instances, vibration sensor(s) 465 may include one or more inertial measurement unit (IMU) sensors and/or the elements thereof. For example, vibration sensor(s) 465 may include one or more gyroscopes for detecting angular acceleration, angular rate and/or angular position (or other rotational signals or data), one or more accelerometers for detecting linear acceleration, linear velocity, and/or linear position, and/or one or more magnetometers for detecting the above-listed types of data, among other possibilities.

In some embodiments (such as, for example, when implemented as a gyroscope), vibration sensor(s) 465 may directly detect angular rate and may integrate to obtain angular position, or alternatively a vibration sensor may directly measure angular position and may determine a change in angular position (e.g., compute the derivative) to obtain angular rate. In many instances, vibration sensor(s) 465 can be used to determine the yaw angle (rotation angle with respect to a vertical axis), the pitch angle (rotation angle with respect to a transverse axis), and/or the roll angle (rotation angle with respect to a longitudinal axis) of the construction machine.

Control unit 460 may include various controllers and modules to assist in the generation of control signal(s) 457 and the computation of other data. Each of the controllers and modules may include dedicated hardware and/or may be performed using the main processor and/or memory of control unit 460. In some embodiments, control unit 460 may include a machine component position estimator 428 that estimates the positions of the machine's components based on sensor data 455. For example, machine component position estimator 428 may use sensor data 455 to estimate the positions of the implement during an IOG instance. Optionally, machine component position estimator 428 may generate a model of the entire construction machine as it is currently situated within the construction site. In such embodiments, the model may be generated not only based on sensor data 455 but additionally using feedback from the actuator(s) 456 and/or by tracking control signal(s) 457.

In some embodiments, control unit 460 may include an IOG detector 434 that uses vibration signal 442 along with other sensor data 455 to predict each IOG period that occurs during a digging period. Each IOG period may be fed into a ground surface mapper 425 that maintains a ground surface map. Ground surface mapper 425 may adjust the ground surface map based on each IOG period provided by IOG detector 434 along with the implement positions provided by machine component position estimator 428.

Control signal(s) 457 may include direct current (DC) or alternating current (AC) voltage signals, DC or AC current signals, and/or information-containing signals. An example of an information-containing signal may be controller area network (CAN) message that may be sent along a CAN bus or other communication medium. In some instances, control signal(s) 457 include a pneumatic or hydraulic pressure. Upon receiving control signal(s) 457, actuator(s) 456 may be caused to move in a specified manner, such as by extending, retracting, rotating, lifting, or lowering by a specified amount. Actuator(s) 456 may use various forms of power to provide movement to the components of the construction machine. For example, actuator(s) 456 may be electric, hydraulic, pneumatic, mechanical, or thermal, among other possibilities.

Figure 5:
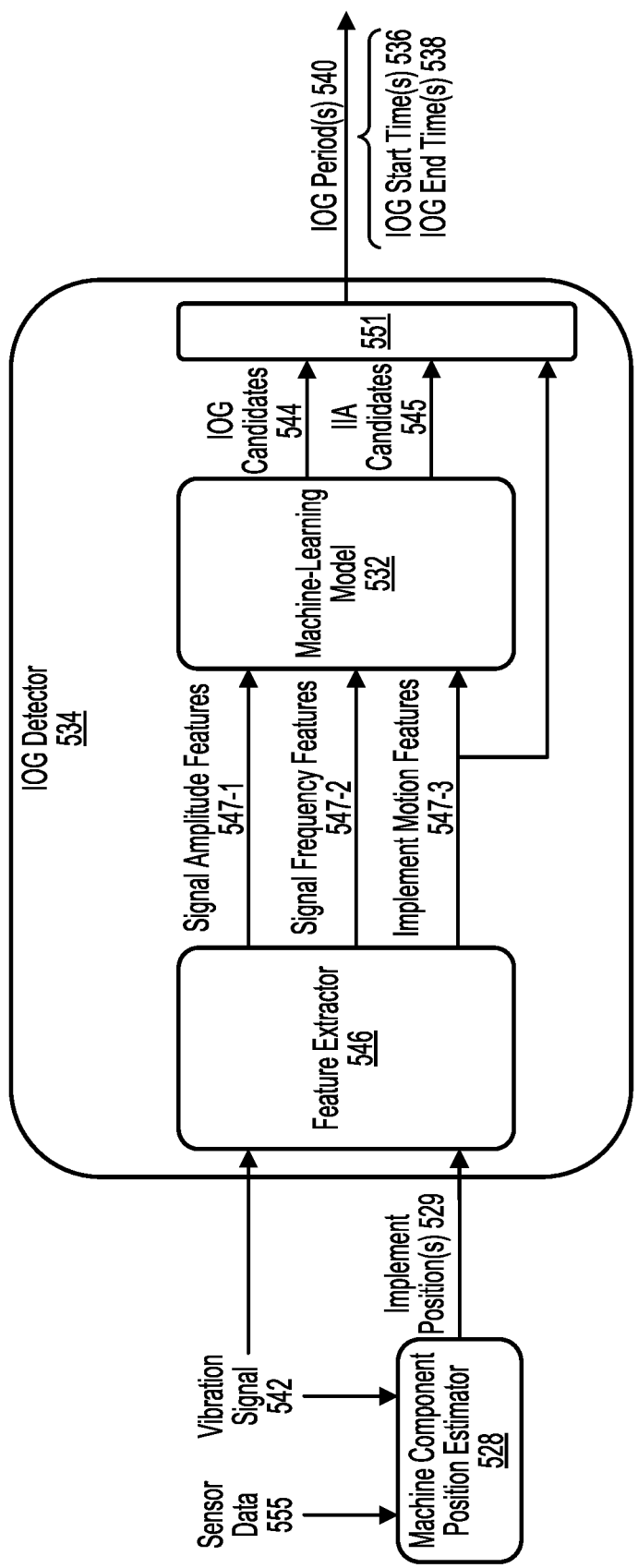
FIG. 5 illustrates an example IOG detector.

FIG. 5 illustrates an example IOG detector 534, in accordance with some embodiments of the present disclosure. As inputs, IOG detector 534 may be provided with a vibration signal 542 and a set of implement position(s) 529, which may be estimated by a machine component position estimator 528 based on sensor data 555 (and optionally based on vibration signal 542). IOG detector 435 may include a feature extractor 546 that extracts one or more features 547 from vibration signal 542 (and optionally implement position(s) 529).

In some embodiments, features 547 may include signal amplitude features 547-1 related to the amplitude of vibration signal 542. For example, signal amplitude features 547-1 may include the time-varying amplitude of vibration signal 542, the magnitude of the amplitude of vibration signal 542, the average of the amplitude of vibration signal 542, the standard deviation of the amplitude of vibration signal 542, the short-time average amplitude over long-time average amplitude (STA/LTA) of vibration signal 542, the long-time vibration changes in vibration signal 542 (for example, when vibration signal 542 is captured by a gyro), among other possibilities.

In some embodiments, features 547 may include signal frequency features 547-2 related to the frequency of vibration signal 542. For example, signal frequency features 547-2 may include the time-varying frequency of vibration signal 542 (e.g., over sequential time windows), the high-frequency energy of vibration signal 542, the low-frequency energy of vibration signal 542, the power spectral density of vibration signal 542, among other possibilities.

In some embodiments, features 547 may include implement motion features 547-3 determined based on implement position(s) 529 (and optionally based on vibration signal 542 when vibration signal 542 includes an IMU signal). For example, implement motion features 547-3 may include the curl or rotation of the implement (e.g., the curl of the excavator's bucket), the distance between the implement and a reference point on the construction machine (e.g., the distance between the implement and the cab), the direction of movement of the implement, the slewing of the construction machine, among other possibilities.

Features 547 may be provided to a machine-learning model 532 that generates an output based on features 547. For example, features 547 may be used for the input to machine-learning model 532 and may be passed through the layers or nodes of machine-learning model 532. The output generated by machine-learning model 532 may be referred to as a model output. The model output may include a set of IOG candidates 544 and/or a set of IIA candidates 545. In various embodiments, IOG candidates 544 and IIA candidates 545 may be directly outputted by machine-learning model 532 or they may be obtained by performing one or more post-processing steps on the model output.

In some embodiments, IOG detector 534 may include a post-processing stage 551 that analyzes the model output (optionally including IOG candidates 544 and/or IIA candidates 545) and predicts IOG period 540 and/or IOG start time 536 and IOG end time 538 based on the analysis. For example, post-processing stage 551 may include steps for identifying clusters of IOG candidates 544 and/or IIA candidates 545 and predicting IOG period 540 and/or IOG start time 536 and IOG end time 538 based on the identified clusters. In one example, the time window that encompasses a cluster of IOG candidates 544 may be used for the prediction of IOG period 540. In another example, the time window between two clusters of IIA candidates 545 that excludes each may be used for the prediction of IOG period 540. In another example, the transition between a cluster of IIA candidates 545 and a cluster of IOG candidates 544 may be used for the prediction of IOG start time 536 and the transition between a cluster of IOG candidates 544 and a cluster of IIA candidates 545 may be used for the prediction of IOG end time 538. In some embodiments, machine-learning model 532 may directly output IOG period 540 and/or IOG start time 536 and IOG end time 538 without the use of post-processing stage 551.

In some embodiments, post-processing stage 551 may use implement motion features 547-3 to predict IOG period 540 and/or IOG start time 536 and IOG end time 538. For example, the movement of the implement towards the cab of the construction machine may be indicative of an IOG instance. In one example, the distance between the implement and the cab may be analyzed to determine a minimum distance value and its associated time, which may be a strong indicator of when IOG end time 538 may occur. In another example, a maximum distance between the implement and the cab and its associated time may be determined, which may be a strong indicator of when IOG start time 536 may occur.

Machine-learning model 532 may be a support-vector machine, a neural network, a convolutional neural network, a Bayesian network, among other possibilities. Machine-learning model 532 may be trained through a training process in which multiple training vibration signals are provided to feature extractor 546 to produce training features that are provided to machine-learning model 532. For each iteration during the training process, IOG period 540 produced using a training vibration signal may be compared to a truth reference to determine any difference (alternatively referred to as the "loss") between the training result and the truth reference. The loss may be used to modify machine-learning model 532 (e.g., by modifying the weights or parameters of machine-learning model 532) so as to reduce the loss during subsequent inferences using machine-learning model 532. It should be noted that while machine-learning model 532 is illustrated as a single machine-learning model, multiple machine-learning models may be employed to handle different types of features 547 or different types of model outputs.

Figure 6A:
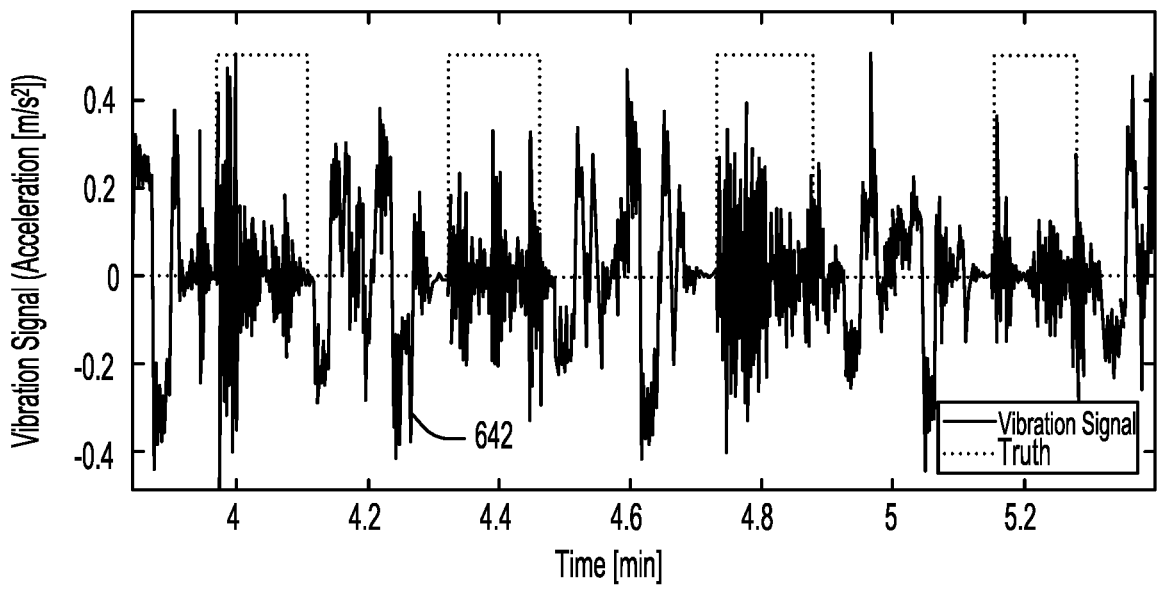
FIGS. 6A and 6B illustrate examples of a vibration signal and its corresponding extracted frequency features, respectively.
Figure 6B:
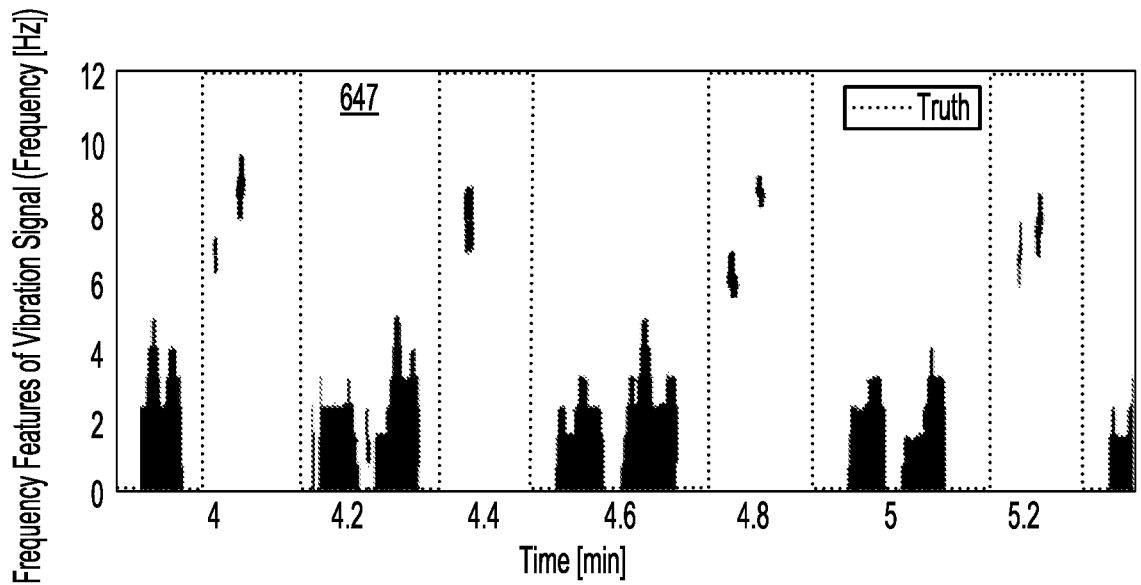

FIGS. 6A and 6B illustrate examples of a vibration signal 642 and its corresponding extracted frequency features 647, respectively, in accordance with some embodiments of the present disclosure. In FIG. 6A, an acceleration signal captured by an accelerometer is shown along with the truth reference indicating when the IOG periods occur. In FIG. 6B, the power spectral density of the acceleration signal is shown along with the truth reference indicating when the IOG periods occur. In some instances, the illustrated vibration signal and frequency features may be used to train the machine-learning model by generating predicted IOG periods using the machine-learning model, comparing the predicted IOG periods to the truth reference, and modifying the machine-learning model based on the comparison.

Figure 7A:
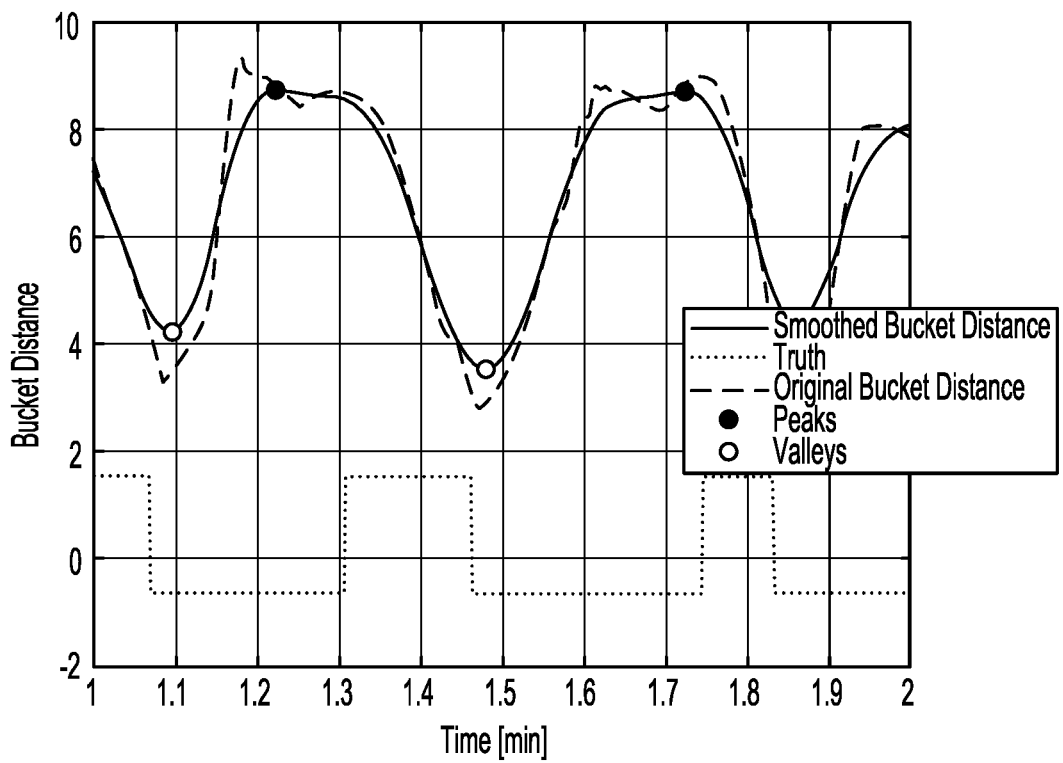
FIGS. 7A and 7B illustrate examples of implement motion features.
Figure 7B:
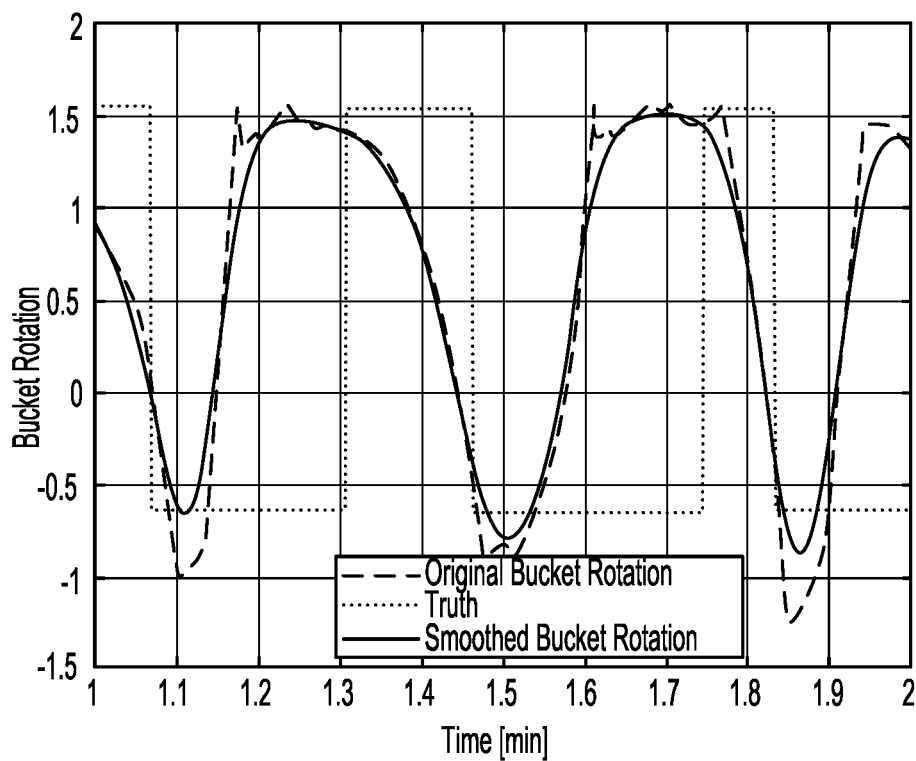

FIGS. 7A and 7B illustrate examples of implement motion features, in accordance with some embodiments of the present disclosure. In FIG. 7A, the implement distance between the implement and the cab (or bucket distance) is shown along with the truth reference indicating when the IOG periods occur. In FIG. 7B, the implement rotation (or bucket rotation, i.e., the angle of the bucket) is shown along with the truth reference indicating when the IOG periods occur. Both of FIGS. 7A and 7B show original data along with smoothed data.

FIGS. 7A and 7B demonstrate that there is a strong correlation between implement motion features and the IOG periods. For example, FIG. 7A shows that the IOG periods are strongly correlated with a decreasing bucket distance. In some embodiments, maximum and minimum values (i.e., peaks and valleys, respectively) of the bucket distance may be identified and the IOG period (including the IOG start and end times) may be constrained to reside between the times associated with the maximum and minimum values. As another example, FIG. 7B shows that the IOG periods are strongly correlated with a decreasing bucket rotation. In some embodiments, maximum and minimum values of the bucket rotation may be identified and the IOG period (including the IOG start and end times) may be constrained to reside between the times associated with the maximum and minimum values.

Figure 8:
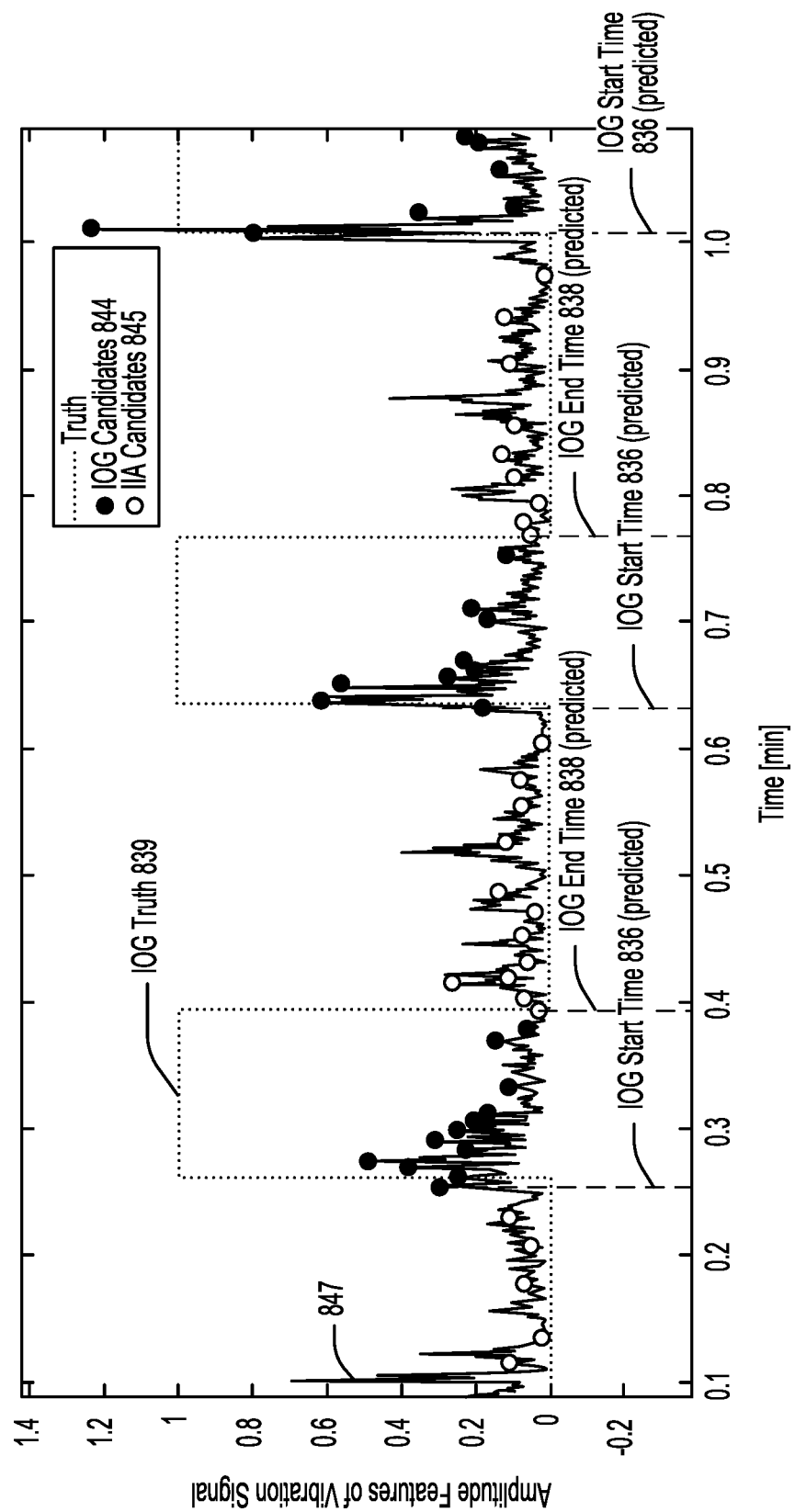
FIG. 8 illustrates an example of a prediction of IOG periods based on a vibration signal and its corresponding amplitude features.

FIG. 8 illustrates an example of a prediction of IOG periods based on a vibration signal and its corresponding amplitude features 847, in accordance with some embodiments of the present disclosure. Also shown are predictions for IOG start times 836 and IOG end times 838 and the truth reference indicating when the IOG periods occur. In the illustrated example, amplitude features 847 represent the changes in the amplitude of the vibration/acceleration signal. Each value in amplitude features 847 is calculated by summing the magnitude of a first window including 8 values and dividing by the sum of the magnitude of a second window including 64 values. The two windows are aligned at the last sample of the windows.

The illustrated amplitude features of the vibration signal are provided to a machine-learning model which generates IOG candidates 844 and IIA candidates 845, which are illustrated in FIG. 8 at their associated times. During a post-processing stage, clusters of IOG candidates 844 and clusters of IIA candidates 845 may be identified. The transitions from clusters of IIA candidates 845 to clusters of IOG candidates 844 may be used to predict IOG start times 836 based on, for example, the time of the first IOG candidate in each IOG cluster. The transitions from clusters of IOG candidates 844 to clusters of IIA candidates 845 may be used to predict IOG end times 838 based on, for example, the time of the first IIA candidate in each IIA cluster and/or the time of the last IOG candidate in each IOG cluster.

Figure 9:
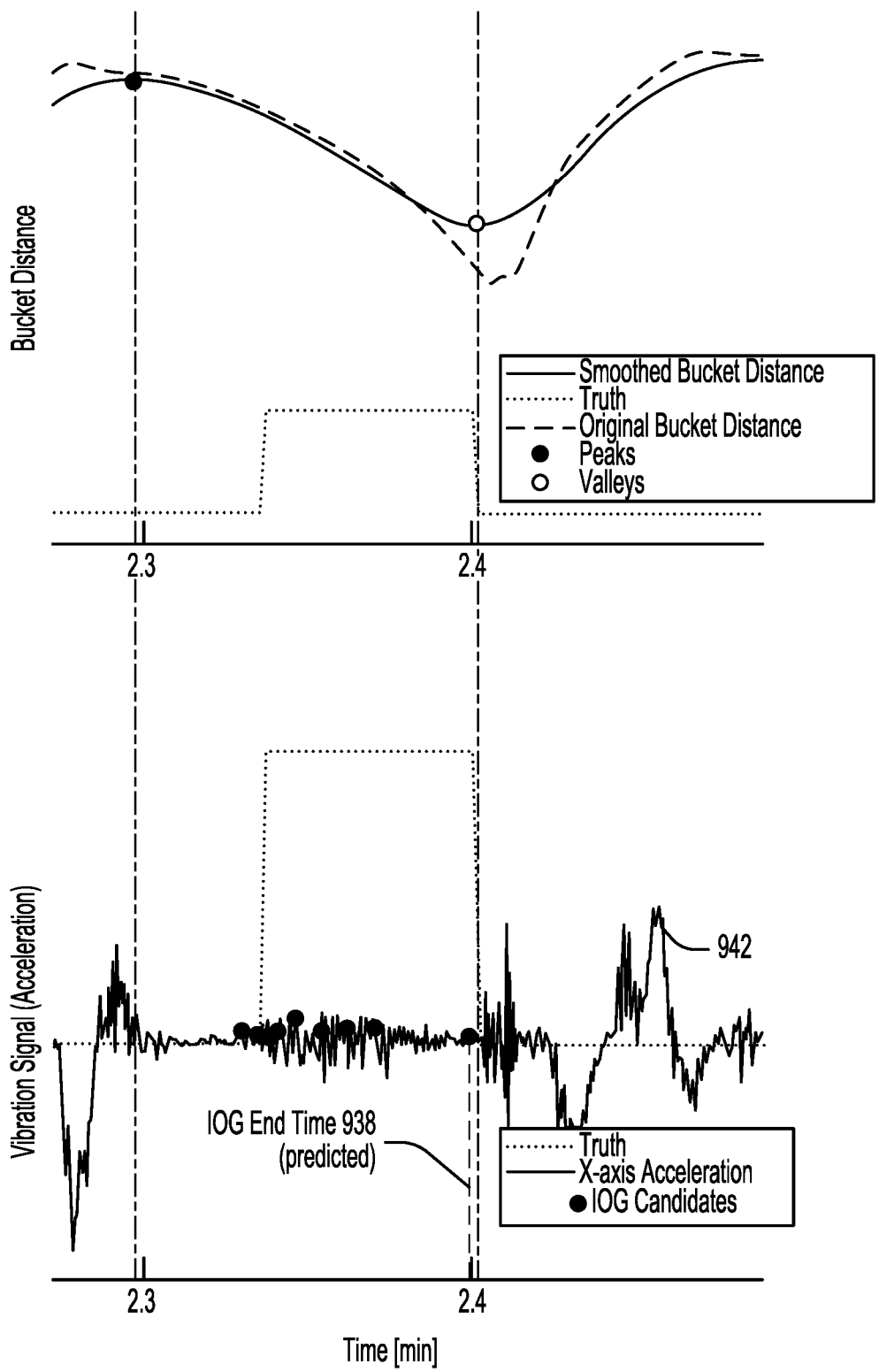
FIG. 9 illustrates an example of a prediction of an IOG end time based on a vibration signal and an implement distance.

FIG. 9 illustrates an example of a prediction of an IOG end time 938 based on a vibration signal 942 and an implement distance (bucket distance), in accordance with some embodiments of the present disclosure. Also shown is a truth reference indicating when the IOG periods occur. In the illustrated example, several IOG candidates are generated by a machine-learning model based on the features of the vibration signal. During a post-processing stage, a cluster of IOG candidates are identified and IOG start and end times are predicted. In some embodiments, the IOG start and end times are constrained to be between the maximum implement distance (maximum bucket distance) and minimum implement distance (minimum bucket distance).

In some embodiments, it may be determined whether the outlier IOG candidate (at roughly 2.4 minutes) should be used to predict IOG end time 838 or whether it should be disregarded. By consulting the time difference between the IOG candidate at 2.4 minutes and the time of the minimum bucket distance (also at roughly 2.4 minutes), it may be determined that the IOG candidate at 2.4 minutes should be used for predicting IOG end time 838 and not be disregarded. In some embodiments, the time difference between a particular IOG candidate and the time of the minimum bucket distance may be compared to a threshold to determine whether the particular IOG candidate should be considered to determine the IOG end time, where a time difference above the threshold causes the particular IOG candidate to be disregarded.

Figure 10:
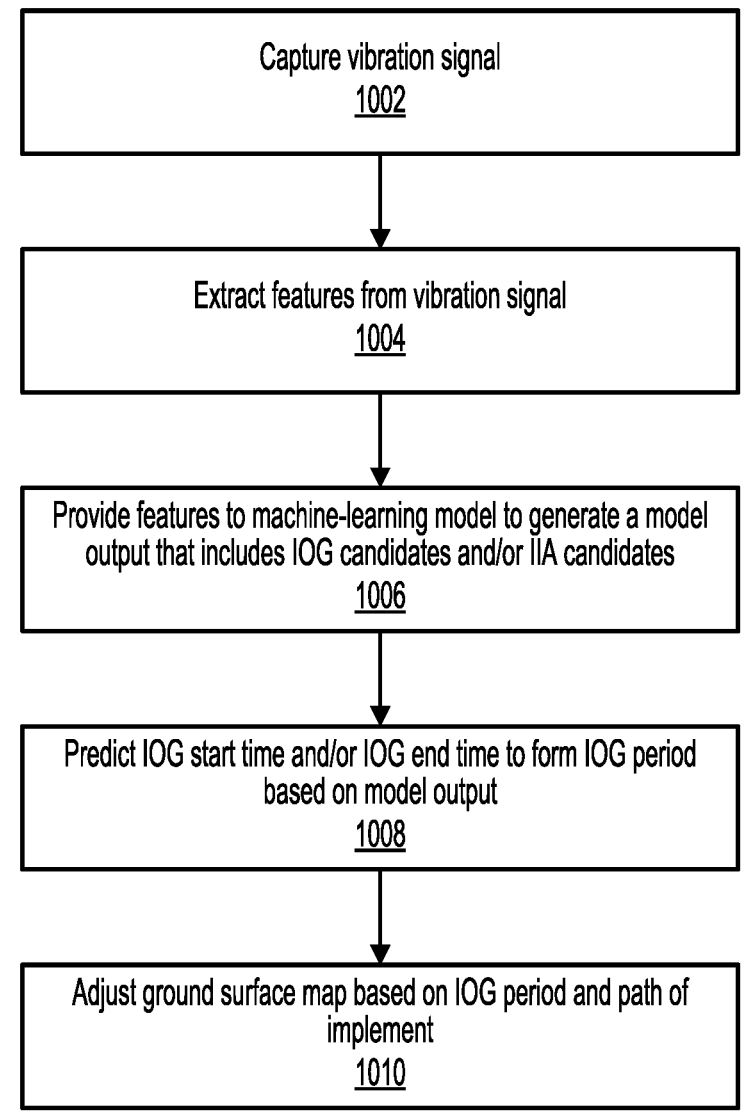
FIG. 10 illustrates an example method.

FIG. 10 illustrates an example method 1000, in accordance with some embodiments of the present disclosure. In various embodiments, method 1000 may be considered to be a method of determining a period during which an implement of a construction machine is interacting with a ground surface, a method of determining a start time and/or and end time of a period during which an implement of a construction machine is interacting with a ground surface, a method of adjusting a ground surface map, a method of generating a ground surface map, among other possibilities. One or more steps of method 1000 may be omitted during performance of method 1000, and steps of method 1000 may be performed in any order and/or in parallel. One or more steps of method 1000 may be performed by one or more processors, such as those included in a control unit (e.g., control units 360, 460). Method 1000 may be implemented as a computer-readable medium or computer program product comprising instructions which, when the program is executed by one or more computers, cause the one or more computers to carry out the steps of method 1000.

At step 1002, a vibration signal (e.g., vibration signals 242, 342, 442, 542, 642, 942) is captured. The vibration signal may be captured using a vibration sensor (e.g., vibration sensors 365, 465). The vibration sensor may be mounted to an implement (e.g., implements 121, 221, 321) of a construction machine (e.g., construction machines 150, 350). The vibration signal may be indicative of a movement of the implement. In some embodiments, the vibration sensor may include an accelerometer and the vibration signal may include an acceleration signal. In some embodiments, the vibration sensor may include a gyroscope and the vibration signal may include a rotation signal. In some embodiments, the vibration sensor may include an IMU sensor (such as an accelerometer or a gyroscope) and the vibration signal may include an IMU signal (such as an acceleration signal or a rotation signal). In some embodiments, the vibration sensor may include an acoustic sensor (such as a microphone).

At step 1004, one or more features (e.g., features 547, 647, 847) are extracted from the vibration signal. The one or more features may include signal amplitude features (e.g., signal amplitude features 547-1), signal frequency features (e.g., signal frequency features 547-2), implement motion features (e.g., implement motion features 547-3), among other possibilities. The one or more features may be extracted by a feature extractor (e.g., feature extractor 546). The feature extractor may extract the one or more features from a set of implement positions (e.g., implement positions 529) in addition to the vibration signal.

At step 1006, the one or more features are provided to a machine-learning model (e.g., machine-learning model 532). Upon providing the one or more features to the machine-learning model, the machine-learning model may generate a model output based on the one or more features. The model output may include a set of IOG candidates (e.g., IOG candidates 544, 844) and/or a set of IIA candidates (e.g., IIA candidates 545, 845). The set of IOG candidates may correspond to times at which the implement is interacting with the ground surface. The set of IIA candidates may correspond to times that the implement is not interacting with the ground surface (i.e., the implement is above the ground surface). The machine-learning model may be a pre-trained support-vector machine, a neural network, among other possibilities.

At step 1008, an IOG start time (e.g., IOG start times 336, 536, 836) and/or an IOG end time (e.g., IOG end times 338, 538, 838, 938) are predicted based on the model output. The IOG start time and the IOG end time may form an IOG period (e.g., IOG periods 340, 540) during which the implement is interacting with a ground surface (e.g., ground surfaces 112, 212) at a construction site (e.g., construction site 310). The implement may be interacting with the ground surface when the implement is cutting or digging into the ground surface. The IOG start time and/or the IOG end time may be predicted based on the set of IOG candidates and/or the set of IIA candidates. In some embodiments, the IOG start time and/or the IOG end time may be predicted based on the implement motion features and/or the set of implement positions.

At step 1010, a ground surface map (e.g., ground surface map 124) is adjusted based on the period (and/or the IOG start time and the IOG end time) during which the implement is interacting with the ground surface. The ground surface map may be adjusted further based on a path of the implement during the period. Adjusting the ground surface map may include modifying/changing/updating the ground surface map to reflect the path of the implement during the period. In some embodiments, the ground surface map may be set equal to the path of the implement (e.g., the positions of the bucket edge) during the period.

It should be noted that method 1000 may be modified to predict different periods associated with operation of the construction machine in addition to or alternative to predicting the IOG period. For example, in various embodiments, method 1000 may be modified to predict a time period in which the construction machine is dumping, slewing, tramming, idling, reversing, accelerating, decelerating, among other possibilities.

Figure 11:
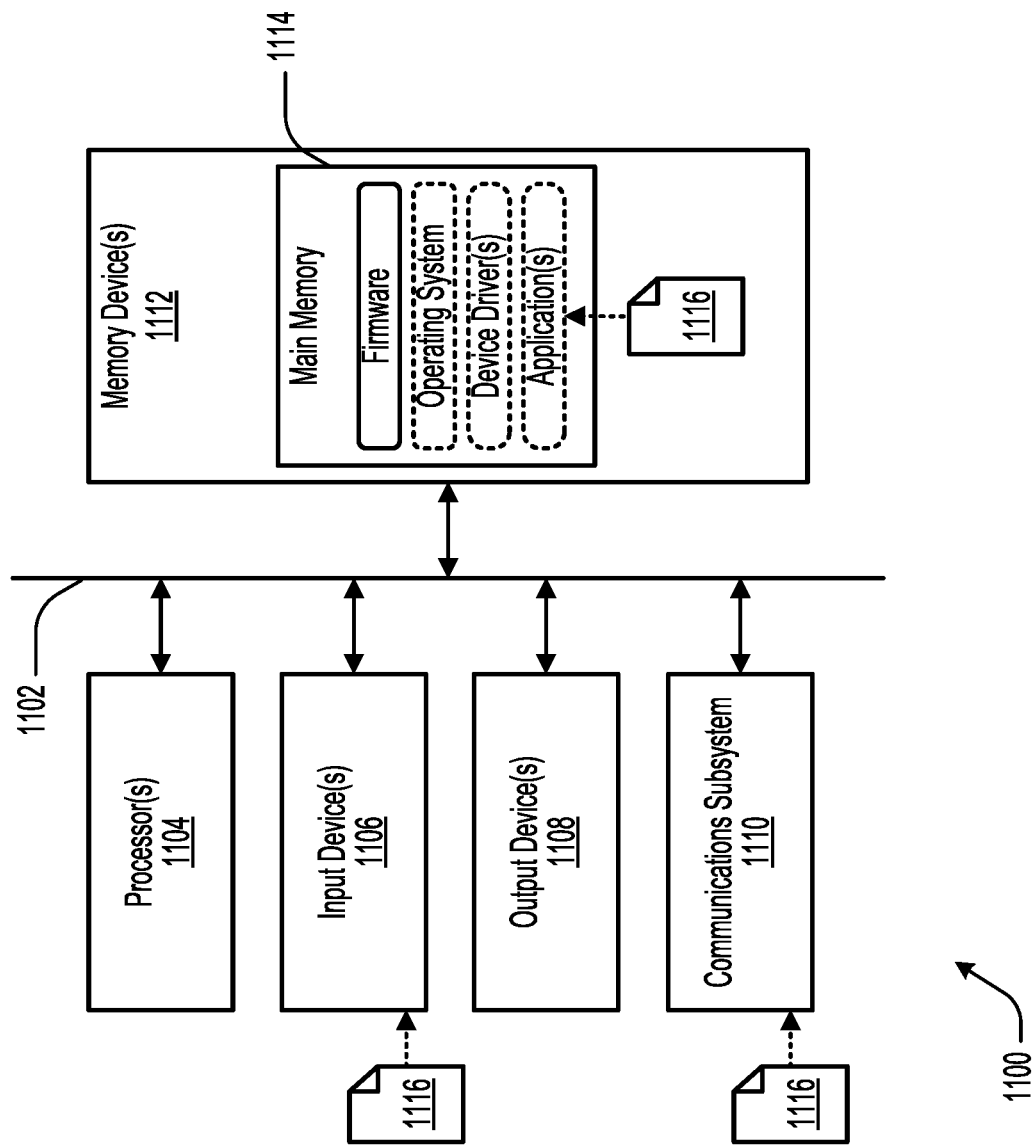
FIG. 11 illustrates an example computer system comprising various hardware elements.

FIG. 11 illustrates an example computer system 1100 comprising various hardware elements, in accordance with some embodiments of the present disclosure. Computer system 1100 may be incorporated into or integrated with devices described herein and/or may be configured to perform some or all of the steps of the methods provided by various embodiments. For example, in various embodiments, computer system 1100 may be incorporated into machine control system 400 and/or may be configured to perform method 1000. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner.

In the illustrated example, computer system 1100 includes a communication medium 1102, one or more processor(s) 1104, one or more input device(s) 1106, one or more output device(s) 1108, a communications subsystem 1110, and one or more memory device(s) 1112. Computer system 1100 may be implemented using various hardware implementations and embedded system technologies. For example, one or more elements of computer system 1100 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device, such as an SoC FPGA, among other possibilities.

The various hardware elements of computer system 1100 may be communicatively coupled via communication medium 1102. While communication medium 1102 is illustrated as a single connection for purposes of clarity, it should be understood that communication medium 1102 may include various numbers and types of communication media for transferring data between hardware elements. For example, communication medium 1102 may include one or more wires (e.g., conductive traces, paths, or leads on a printed circuit board (PCB) or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 1102 may include one or more buses connecting pins of the hardware elements of computer system 1100. For example, communication medium 1102 may include a bus that connects processor(s) 1104 with main memory 1114, referred to as a system bus, and a bus that connects main memory 1114 with input device(s) 1106 or output device(s) 1108, referred to as an expansion bus. The system bus may itself consist of several buses, including an address bus, a data bus, and a control bus. The address bus may carry a memory address from processor(s) 1104 to the address bus circuitry associated with main memory 1114 in order for the data bus to access and carry the data contained at the memory address back to processor(s) 1104. The control bus may carry commands from processor(s) 1104 and return status signals from main memory 1114. Each bus may include multiple wires for carrying multiple bits of information and each bus may support serial or parallel transmission of data.

Processor(s) 1104 may include one or more central processing units (CPUs), graphics processing units (GPUs), neural network processors or accelerators, digital signal processors (DSPs), and/or other general-purpose or special-purpose processors capable of executing instructions. A CPU may take the form of a microprocessor, which may be fabricated on a single IC chip of metal-oxide-semiconductor field-effect transistor (MOSFET) construction. Processor(s) 1104 may include one or more multi-core processors, in which each core may read and execute program instructions concurrently with the other cores, increasing speed for programs that support multithreading.

Input device(s) 1106 may include one or more of various user input devices such as a mouse, a keyboard, a microphone, as well as various sensor input devices, such as an image capture device, a pressure sensor (e.g., barometer, tactile sensor), a temperature sensor (e.g., thermometer, thermocouple, thermistor), a movement sensor (e.g., accelerometer, gyroscope, tilt sensor), a light sensor (e.g., photodiode, photodetector, charge-coupled device), and/or the like. Input device(s) 1106 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 1108 may include one or more of various devices that convert information into human-readable form, such as without limitation a display device, a speaker, a printer, a haptic or tactile device, and/or the like. Output device(s) 1108 may also include devices for writing to removable storage devices or other removable media, such as those described in reference to input device(s) 1106. Output device(s) 1108 may also include various actuators for causing physical movement of one or more components. Such actuators may be hydraulic, pneumatic, electric, and may be controlled using control signals generated by computer system 1100.

Communications subsystem 1110 may include hardware components for connecting computer system 1100 to systems or devices that are located external to computer system 1100, such as over a computer network. In various embodiments, communications subsystem 1110 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 1112 may include the various data storage devices of computer system 1100. For example, memory device(s) 1112 may include various types of computer memory with various response times and capacities, from faster response times and lower capacity memory, such as processor registers and caches (e.g., L0, L1, L2), to medium response time and medium capacity memory, such as random-access memory (RAM), to lower response times and lower capacity memory, such as solid-state drives and hard drive disks. While processor(s) 1104 and memory device(s) 1112 are illustrated as being separate elements, it should be understood that processor(s) 1104 may include varying levels of on-processor memory, such as processor registers and caches that may be utilized by a single processor or shared between multiple processors.

Memory device(s) 1112 may include main memory 1114, which may be directly accessible by processor(s) 1104 via the memory bus of communication medium 1102. For example, processor(s) 1104 may continuously read and execute instructions stored in main memory 1114. As such, various software elements may be loaded into main memory 1114 to be read and executed by processor(s) 1104 as illustrated in FIG. 11. Typically, main memory 1114 is volatile memory, which loses all data when power is turned off and accordingly needs power to preserve stored data. Main memory 1114 may further include a small portion of non-volatile memory containing software (e.g., firmware, such as BIOS) that is used for reading other software stored in memory device(s) 1112 into main memory 1114. In some embodiments, the volatile memory of main memory 1114 is implemented as RAM, such as dynamic random-access memory (DRAM), and the non-volatile memory of main memory 1114 is implemented as read-only memory (ROM), such as flash memory, erasable programmable read-only memory (EPROM), or electrically erasable programmable read-only memory (EEPROM).

Computer system 1100 may include software elements, shown as being currently located within main memory 1114, which may include an operating system, device driver(s), firmware, compilers, and/or other code, such as one or more application programs, which may include computer programs provided by various embodiments of the present disclosure. Merely by way of example, one or more steps described with respect to any methods discussed above, may be implemented as instructions 1116, which are executable by computer system 1100. In one example, such instructions 1116 may be received by computer system 1100 using communications subsystem 1110 (e.g., via a wireless or wired signal that carries instructions 1116), carried by communication medium 1102 to memory device(s) 1112, stored within memory device(s) 1112, read into main memory 1114, and executed by processor(s) 1104 to perform one or more steps of the described methods. In another example, instructions 1116 may be received by computer system 1100 using input device(s) 1106 (e.g., via a reader for removable media), carried by communication medium 1102 to memory device(s) 1112, stored within memory device(s) 1112, read into main memory 1114, and executed by processor(s) 1104 to perform one or more steps of the described methods.

In some embodiments of the present disclosure, instructions 1116 are stored on a computer-readable storage medium (or simply computer-readable medium). Such a computer-readable medium may be non-transitory and may therefore be referred to as a non-transitory computer-readable medium. In some cases, the non-transitory computer-readable medium may be incorporated within computer system 1100. For example, the non-transitory computer-readable medium may be one of memory device(s) 1112 (as shown in FIG. 11). In some cases, the non-transitory computer-readable medium may be separate from computer system 1100. In one example, the non-transitory computer-readable medium may be a removable medium provided to input device(s) 1106 (as shown in FIG. 11), such as those described in reference to input device(s) 1106, with instructions 1116 being read into computer system 1100 by input device(s) 1106. In another example, the non-transitory computer-readable medium may be a component of a remote electronic device, such as a mobile phone, that may wirelessly transmit a data signal that carries instructions 1116 to computer system 1100 and that is received by communications subsystem 1110 (as shown in FIG. 11).

Instructions 1116 may take any suitable form to be read and/or executed by computer system 1100. For example, instructions 1116 may be source code (written in a human-readable programming language such as Java, C, C++, C#, Python), object code, assembly language, machine code, microcode, executable code, and/or the like. In one example, instructions 1116 are provided to computer system 1100 in the form of source code, and a compiler is used to translate instructions 1116 from source code to machine code, which may then be read into main memory 1114 for execution by processor(s) 1104. As another example, instructions 1116 are provided to computer system 1100 in the form of an executable file with machine code that may immediately be read into main memory 1114 for execution by processor(s) 1104. In various examples, instructions 1116 may be provided to computer system 1100 in encrypted or unencrypted form, compressed or uncompressed form, as an installation package or an initialization for a broader software deployment, among other possibilities.

In one aspect of the present disclosure, a system (e.g., computer system 1100) is provided to perform methods in accordance with various embodiments of the present disclosure. For example, some embodiments may include a system comprising one or more processors (e.g., processor(s) 1104) that are communicatively coupled to a non-transitory computer-readable medium (e.g., memory device(s) 1112 or main memory 1114). The non-transitory computer-readable medium may have instructions (e.g., instructions 1116) stored therein that, when executed by the one or more processors, cause the one or more processors to perform the methods described in the various embodiments.

In another aspect of the present disclosure, a computer-program product that includes instructions (e.g., instructions 1116) is provided to perform methods in accordance with various embodiments of the present disclosure. The computer-program product may be tangibly embodied in a non-transitory computer-readable medium (e.g., memory device(s) 1112 or main memory 1114). The instructions may be configured to cause one or more processors (e.g., processor(s) 1104) to perform the methods described in the various embodiments.

In another aspect of the present disclosure, a non-transitory computer-readable medium (e.g., memory device(s) 1112 or main memory 1114) is provided. The non-transitory computer-readable medium may have instructions (e.g., instructions 1116) stored therein that, when executed by one or more processors (e.g., processor(s) 1104), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of determining a period during which an implement of a construction machine is interacting with a ground surface, the method comprising:
    capturing a vibration signal that is indicative of a movement of the implement;
    extracting one or more features from the vibration signal;
    providing the one or more features to a machine-learning model to generate a model output, the model output including a set of implement-on-ground (IOG) candidates corresponding to times at which the implement is interacting with the ground surface and a set of implement-in-air (IIA) candidates corresponding to times at which the implement is not interacting with the ground surface;
    predicting an IOG start time based on a transition between a first cluster of the set of IIA candidates and a cluster of the set of IOG candidates and an IOG end time based on a transition between the cluster of the set of IOG candidates and a second cluster of the set of IIA candidates, the IOG start time and the IOG end time forming the period during which the implement is interacting with the ground surface;
    adjusting a ground surface map based on the period during which the implement is interacting with the ground surface and a path of the implement; and
    generating control signals based on the ground surface map and sending the control signals to actuators of the construction machine to cause movement of the construction machine.

2. The method of claim 1, wherein the vibration signal is captured using a vibration sensor mounted to the construction machine.

3. The method of claim 2, wherein the vibration sensor includes an accelerometer and the vibration signal includes an acceleration signal.

4. The method of claim 2, wherein the vibration sensor includes a gyroscope and the vibration signal includes a rotation signal.

5. The method of claim 2, wherein the vibration sensor is mounted to the implement.

6. The method of claim 1, wherein the one or more features include at least one of signal amplitude features or signal frequency features.

7. The method of claim 1, wherein the machine-learning model is a pre-trained support-vector machine.

8. A system comprising:
    one or more processors; and
    a computer-readable medium comprising instructions that, when executed by the one or more processors, cause the one or more processors to:
    capture a vibration signal that is indicative of a movement of an implement of a construction machine;
    extract one or more features from the vibration signal;
    provide the one or more features to a machine-learning model to generate a model output, the model output including a set of implement-on-ground (IOG) candidates corresponding to times at which the implement is interacting with a ground surface and a set of implement-in-air (IIA) candidates corresponding to times at which the implement is not interacting with the ground surface;
    predict an IOG start time based on a transition between a first cluster of the set of IIA candidates and a cluster of the set of IOG candidates and an IOG end time based on a transition between the cluster of the set of IOG candidates and a second cluster of the set of IIA candidates, the IOG start time and the IOG end time forming a period during which the implement is interacting with the ground surface;
    adjust a ground surface map based on the period during which the implement is interacting with the ground surface and a path of the implement; and
    generate control signals based on the ground surface map and send the control signals to actuators of the construction machine to cause movement of the construction machine.

9. The system of claim 8, wherein the vibration signal is captured using a vibration sensor mounted to the construction machine.

10. The system of claim 9, wherein the vibration sensor includes an accelerometer and the vibration signal includes an acceleration signal.

11. The system of claim 9, wherein the vibration sensor is mounted to the implement.

12. The system of claim 8, wherein the one or more features include at least one of signal amplitude features or signal frequency features.

13. The system of claim 8, wherein the machine-learning model is a pre-trained support-vector machine.

14. The system of claim 8, wherein the IOG start time and the IOG end time are predicted further based on a set of implement positions.

15. A non-transitory computer-readable medium comprising instructions that, when executed by one or more processors, cause the one or more processors to perform operations for determining a period during which an implement of a construction machine interacts with a ground surface, the operations comprising:
capturing a vibration signal that is indicative of a movement of the implement;
extracting one or more features from the vibration signal;
providing the one or more features to a machine-learning model to generate a model output, the model output including a set of implement-on-ground (IOG) candidates corresponding to times at which the implement is interacting with the ground surface and a set of implement-in-air (IIA) candidates corresponding to times at which the implement is not interacting with the ground surface; and
predicting an IOG start time based on a transition between a first cluster of the set of IIA candidates and a cluster of the set of IOG candidates and an IOG end time based on a transition between the cluster of the set of IOG candidates and a second cluster of the set of IIA candidates, the IOG start time and the IOG end time forming the period during which the implement is interacting with the ground surface;
adjusting a ground surface map based on the period during which the implement is interacting with the ground surface and a path of the implement; and
generating control signals based on the ground surface map and sending the control signals to actuators of the construction machine to cause movement of the construction machine.

16. The non-transitory computer-readable medium of claim 15, wherein the vibration signal is captured using a vibration sensor mounted to the construction machine.

17. The non-transitory computer-readable medium of claim 16, wherein the vibration sensor includes an accelerometer and the vibration signal includes an acceleration signal.

18. The non-transitory computer-readable medium of claim 16, wherein the vibration sensor includes a gyroscope and the vibration signal includes a rotation signal.

19. The non-transitory computer-readable medium of claim 16, wherein the vibration sensor is mounted to the implement.

* * * * *